(12) United States Patent
De Pelsemaeker et al.

(10) Patent No.: US 11,654,746 B2
(45) Date of Patent: May 23, 2023

(54) ELEMENT FOR COOLING THE AIR OF A MOTOR VEHICLE

(71) Applicant: Valeo Systemes Thermiques, Le Mesnil Saint Denis (FR)

(72) Inventors: Georges De Pelsemaeker, Poigny-la-Foret (FR); Kamel Azzouz, Paris (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 96 days.

(21) Appl. No.: 17/186,554

(22) Filed: Mar. 12, 2021

(65) Prior Publication Data

US 2021/0188033 A1  Jun. 24, 2021

Related U.S. Application Data

(62) Division of application No. 14/899,963, filed as application No. PCT/EP2014/062547 on Jun. 16, 2014, now abandoned.

(30) Foreign Application Priority Data

Jun. 20, 2013 (FR) ..................................... 1355815

(51) Int. Cl.
  *B60H 1/00* (2006.01)
  *F28D 20/02* (2006.01)
(52) U.S. Cl.
  CPC ............. *B60H 1/005* (2013.01); *F28D 20/02* (2013.01)

(58) Field of Classification Search
  CPC ....... B60H 1/005; F28D 20/00; F28D 20/023; Y02E 60/147
  See application file for complete search history.

(56) References Cited

U.S. PATENT DOCUMENTS

| 4,131,158 A | 12/1978 | Abhat et al. |
| 4,241,782 A * | 12/1980 | Schoenfelder .......... F28D 20/02 |
| | | 126/400 |
| 7,191,820 B2 | 3/2007 | Chou et al. |
| 7,614,397 B1 * | 11/2009 | Munson, Jr. ............ F24S 30/45 |
| | | 126/618 |
| 2007/0255002 A1 | 11/2007 | Alba |

(Continued)

FOREIGN PATENT DOCUMENTS

| DE | 102011004202 A1 | 8/2011 |
| JP | 2009035098 A | 2/2009 |

(Continued)

OTHER PUBLICATIONS

International Search Report for International Application No. PCT/EP2014/062547 dated Jul. 23, 2014, 7 pages.

(Continued)

*Primary Examiner* — Kun Kai Ma
(74) *Attorney, Agent, or Firm* — Howard & Howard Attorneys PLLC

(57) ABSTRACT

Disclosed is an element for cooling the air in a motor vehicle, including a composite phase-change material (40) made of at least one first material which is a phase-change material (42) and one second material (44) of which the structure forms a support matrix for the phase-change material (42), the composite phase-change material (40) being covered with a heat-conducting protective layer (46).

19 Claims, 4 Drawing Sheets

(56) References Cited

U.S. PATENT DOCUMENTS

Figure 1:
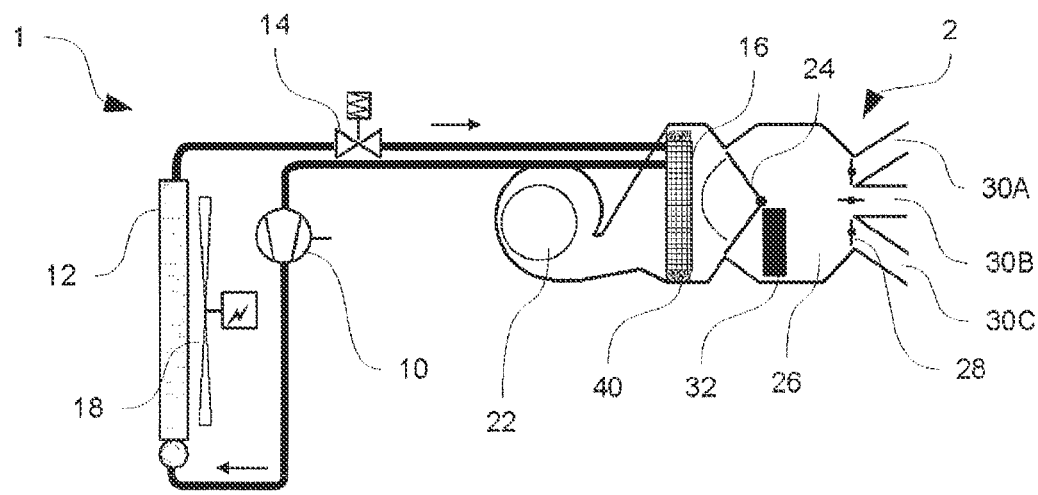

| | | | |
|---|---|---|---|
| 2009/0188266 A1* | 7/2009 | Hung | B60H 1/005 |
| | | | 62/239 |
| 2011/0253345 A1 | 10/2011 | Ryoson et al. | |
| 2012/0042687 A1 | 2/2012 | Kamoshida et al. | |
| 2015/0060017 A1* | 3/2015 | Chung | F28F 1/42 |
| | | | 165/104.17 |
| 2016/0137020 A1 | 5/2016 | De Pelsemaeker et al. | |

FOREIGN PATENT DOCUMENTS

| | | |
|---|---|---|
| JP | 2012101604 A | 5/2012 |
| WO | 2011142224 A1 | 11/2011 |

OTHER PUBLICATIONS

English language abstract and machine-assisted English language translation for DE 10 2011 004 202 extracted from espacenet.com database on Jan. 14, 2016, 18 pages.

English language abstract and machine-assisted English language translation for JP 2009-035098 A extracted from espacenet.com database on Jan. 14, 2016, 25 pages.

English language abstract and machine-assisted English language translation for JP 2012-101604 A extracted from espacenet.com database on Jan. 14, 2016, 22 pages.

English language abstract for WO 2011/142224 extracted from espacenet.com database on Jan. 14, 2016, 1 page.

* cited by examiner

ELEMENT FOR COOLING THE AIR OF A MOTOR VEHICLE

RELATED APPLICATIONS

This application is a divisional of U.S. patent application Ser. No. 14/899,963, filed on Dec. 18, 2015, the National Stage of International Patent Application No. PCT/EP2014/062547, filed on Jun. 16, 2014, which claims priority to and all the advantages of French Patent Application No. 13/55815, filed on Jun. 20, 2013, the content of which is incorporated herein by reference.

The present invention relates to an element for cooling the air in a motor vehicle, and more particularly to an element in the region of an air-conditioning device in a motor vehicle comprising a composite phase-change material.

Air-conditioning devices for motor vehicles generally comprise an air-conditioning loop in which a heat-transfer fluid circulates. The air-conditioning loop in particular comprises a compressor, a first heat exchanger, an expansion valve and a second heat exchanger that is placed in a duct for the inlet of air from the passenger compartment.

In an air-conditioning mode, the air-conditioning loop allows the air intended for the passenger compartment to be cooled when the first heat exchanger acts as the condenser and the second heat exchanger acts as the evaporator. In this configuration, the heat energy removed by the second heat exchanger from the air intended for the passenger compartment is released by condensation in the region of the first heat exchanger.

In the case of what is known as a reversible air-conditioning device, the air intended for the passenger compartment can be heated by passing through the air-conditioning loop in heat-pump mode. In this mode, the functions of the first and second heat exchangers are reversed. The first heat exchanger thus acts as the evaporator, removing heat energy from the outside air. Said heat energy is then released in the region of the second heat exchanger, which acts as the condenser and thus heats the air intended for the passenger compartment.

Nevertheless, in motor vehicles equipped with an alternator starter for implementing a device for automatically stopping and restarting the engine, stopping the engine at traffic lights or at a stop sign causes the compressor in the air-conditioning loop to stop operating and therefore causes said air-conditioning loop to stop operating.

In order to prolong the cooling of the air intended for the passenger compartment in air-conditioning mode, integrating an element comprising a composite phase-change material is known. When the air-conditioning loop is in operation, the composite phase-change material, like the air intended for the passenger compartment, yields the heat energy to the heat-transfer fluid while passing into the solid state. When the air-conditioning loop is stopped, the air intended for the passenger compartment circulating in contact with the phase-change material is cooled by said phase-change material, which takes heat energy therefrom while passing into the liquid phase.

The composite phase-change material comprises at least one first material which is a phase-change material and one second material of which the structure forms a support matrix for said phase-change material. The composite phase-change material is such that, owing to its composite structure, it maintains a rigid structure whether the phase-change material is in a solid or liquid state.

However, the use of a composite phase-change material may pose problems relating to durability. In fact, through use, the phase-change material present in its support matrix may reduce, for example by evaporation or by flow. Over time, this therefore leads to a reduction in the efficiency of said composite phase-change material.

One of the objects of the invention is therefore to propose an element for cooling the air comprising a composite phase-change material that is durable over time and an air-conditioning device for a motor vehicle which overcome at least some of the drawbacks of the prior art.

The present invention therefore relates to an element for cooling the air in a motor vehicle, comprising a composite phase-change material made of at least one first material which is a phase-change material and one second material of which the structure forms a support matrix for said phase-change material, said composite phase-change material being covered with a heat-conducting protective layer.

The fact that the composite phase-change material is covered with a heat-conducting protective layer prevents the phase-change material from escaping, either by flow or by evaporation. In addition, the fact that the protective layer is heat-conducting allows good heat exchange to be maintained between the air flow that passes in contact with the composite phase-change material and the phase-change material.

According to one aspect of the invention, the protective layer is an oleophobic and hydrophobic surface treatment having organic/inorganic hybrid nanoparticles.

According to another aspect of the invention, the protective layer is a metal film having high thermal conductivity.

According to another aspect of the invention, the protective layer is an evaporative layer of heat-conducting polymer.

According to another aspect of the invention, the composite phase-change material comprises at least one rigid structural reinforcement therewithin.

According to another aspect of the invention, the rigid structural reinforcement is a metal framework.

According to another aspect of the invention, the rigid structural reinforcement is a plastics framework.

The present invention also relates to an air-conditioning device for a motor vehicle, comprising an air-conditioning loop which comprises a first heat exchanger that is in contact with the outside air and a second heat exchanger that is placed in an air-conditioning housing, characterised in that it comprises at least one element for cooling the air as described above, said element being placed in the region of the air diffuser in the passenger compartment.

According to one aspect of the air-conditioning device according to the invention, at least one element for cooling the air forms a diffusion grating at the outlet of the air diffuser in the passenger compartment.

According to another aspect of the air-conditioning device according to the invention, at least one element for cooling the air forms flaps for orienting and/or closing off the air flow entering the passenger compartment.

Figure 2A:
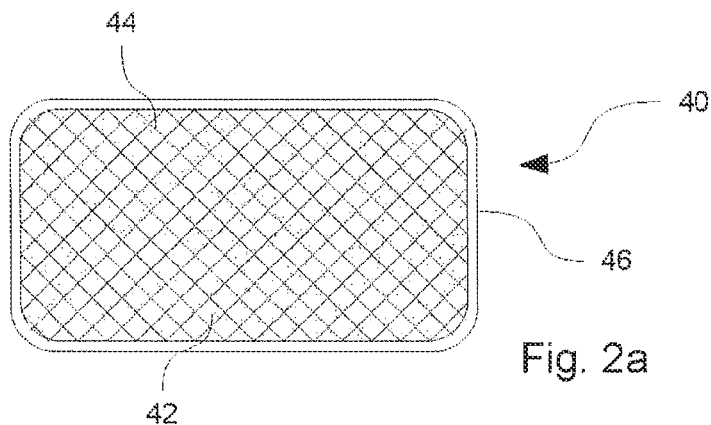
Figure 2B:
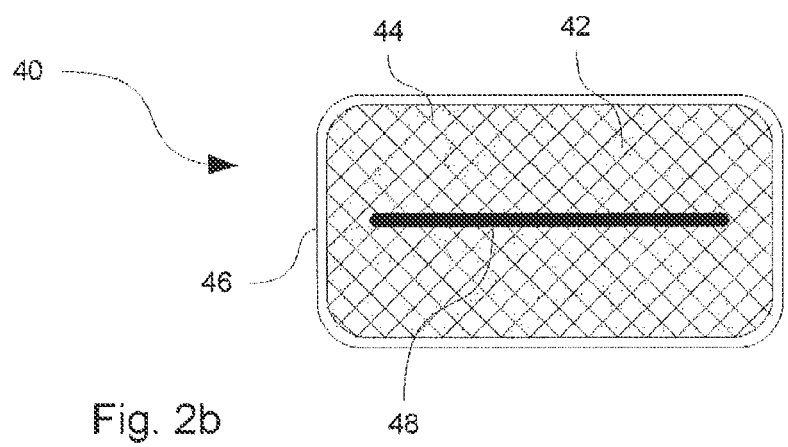
Figure 3:
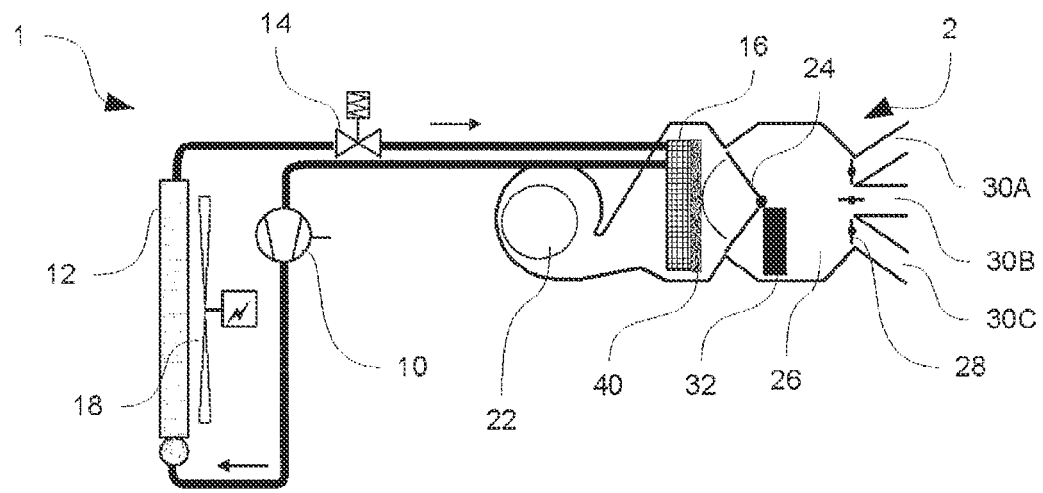
Figure 4:
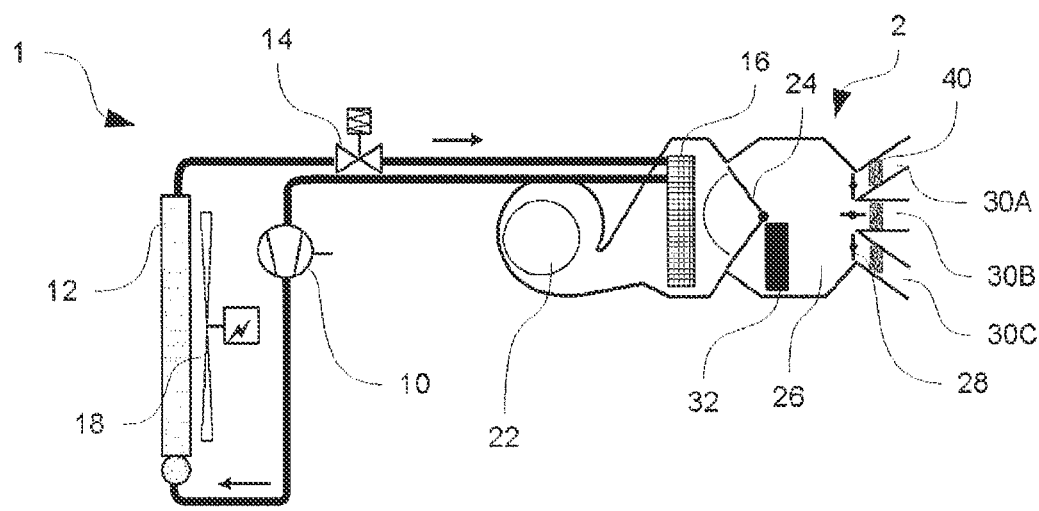
Figure 5:
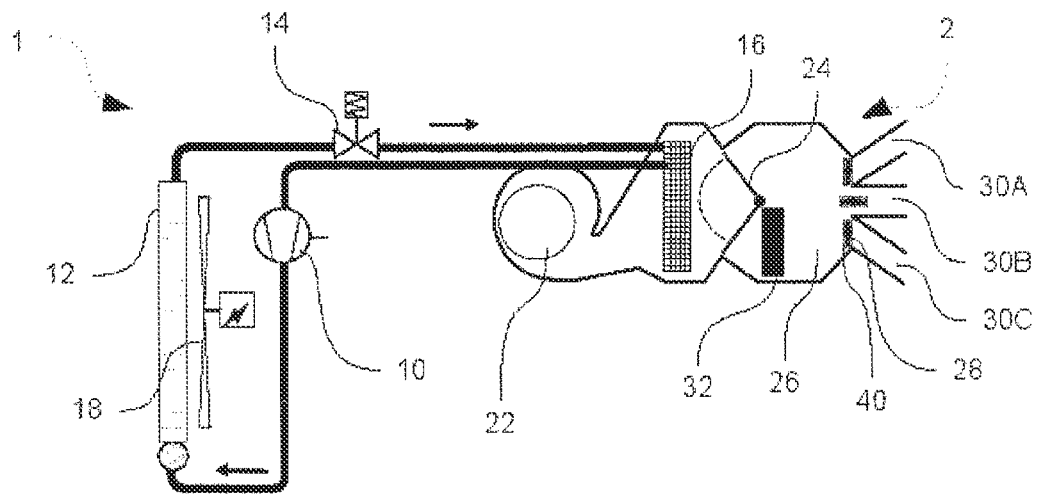
Figure 6:
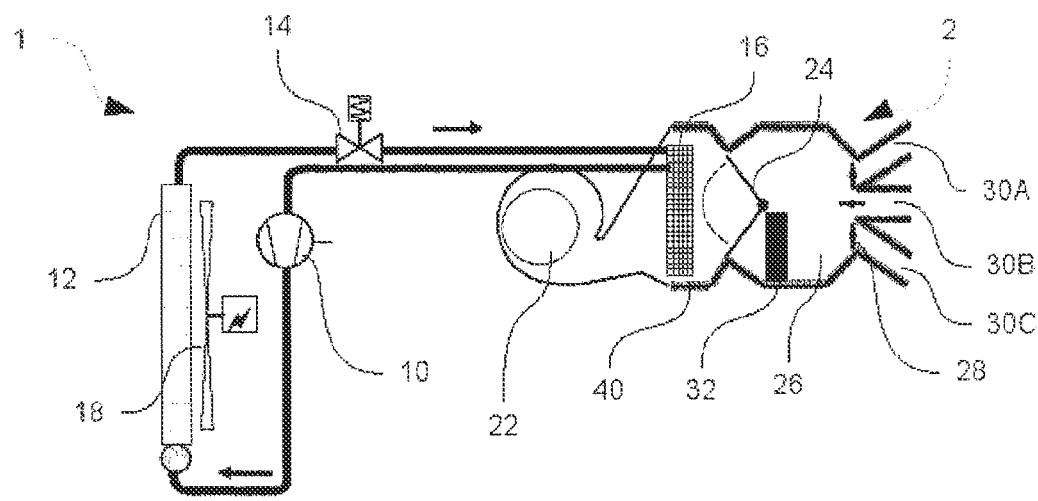
Figure 7:
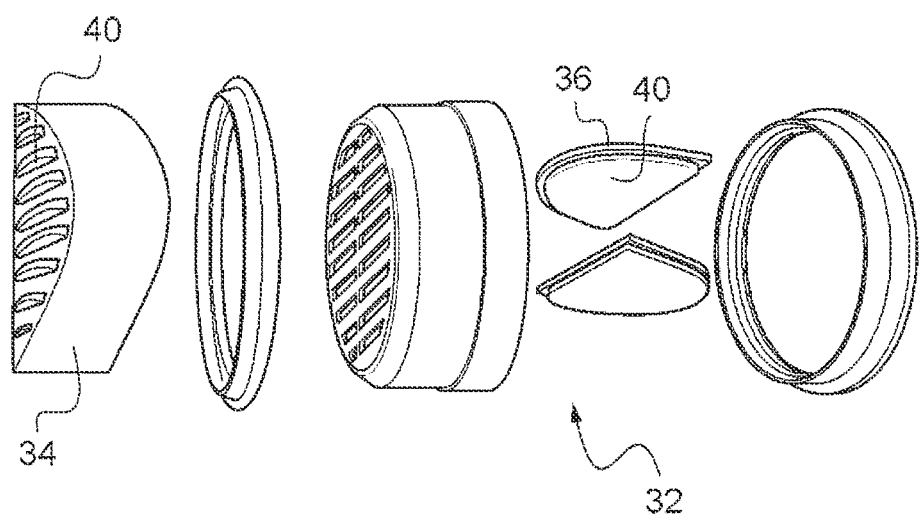

Other features and advantages of the invention will emerge more clearly upon reading the following description, which is given by way of an illustrative and non-limiting example, and from the accompanying drawings, in which:

FIG. 1 is a schematic view of an air-conditioning device for a motor vehicle according to a first embodiment, FIGS. 2*a* and 2*b* are schematic sectional views of the structure of the composite phase-change material, FIG. 3 is a schematic view of an air-conditioning device for a motor vehicle according to a second embodiment, FIG. 4 is a schematic view of an air-conditioning device for a motor vehicle according to a third embodiment, FIG. 5 is a schematic view of an air-conditioning device for a motor vehicle according to a fourth embodiment, FIG. 6 is a schematic view of an air-conditioning device for a motor vehicle according to a fifth embodiment, and FIG. 7 is a perspective exploded view of an air diffuser in the passenger compartment.

In the various figures, identical elements bear the same reference numerals.

FIG. 1 is a schematic view of an air-conditioning device 1. Said air-conditioning device 1 comprises an air-conditioning loop in which a heat-transfer fluid circulates, and comprises a first heat exchanger 12, an expansion valve 14, a second heat exchanger 16 and a compressor 10.

The first heat exchanger 12 may be placed in contact with the air outside the vehicle, for example in the region of the front surface. Said first heat exchanger 12 may in particular be coupled to a fan 18 that allows the outside air to pass through said heat exchanger, if the motor vehicle is moving at low speed or has stopped. The second heat exchanger 16 is in turn placed within an air-conditioning housing 2. The compressor 10 is placed at the outlet of the second heat exchanger 16 and the expansion valve 14 is placed at the inlet of said heat exchanger. When the air-conditioning loop is in air-conditioning mode and is cooling the air intended for the passenger compartment, the first heat exchanger 12 is a condenser which yields the heat energy to the air in order to allow the heat-transfer fluid to pass from a gaseous phase to a liquid phase and the second heat exchanger 16 is an evaporator which captures the heat energy of the air intended for the passenger compartment in order to allow the heat-transfer fluid to pass from a liquid phase to a gaseous phase.

The air-conditioning housing 2 in turn comprises a mixing chamber 26 and air-distribution ducts 30A, 30B, 30C. A fan 22 may also be placed upstream of the air-conditioning housing 2 in order to propel the air through said air-conditioning housing 2.

The air intended for the passenger compartment is propelled by the fan 22, passes through the second heat exchanger 16 and enters the mixing chamber 26. The entry of the air in said mixing chamber 26 is controlled and regulated by a mixing flap 24. The orientation of the mixing flap 24 makes it possible to guide the air intended for the passenger compartment either directly towards the distribution ducts, the air being cold in this case, or indeed through a heater 32, for example an additional electrical heating device having a positive temperature coefficient, the air being heated in this case. There is also an intermediate position, in which the air passes on either side of the mixing flap 24, and this allows cold air to be mixed with heated air in the mixing chamber 26. From the mixing chamber, the air intended for the passenger compartment is distributed by means of closure flaps 28 to the regions of the passenger compartment via the air-distribution ducts 30A, 30B and 30C. For example, the air-distribution duct 30A guides the air towards the air outlets below the windscreen, the air-distribution duct 30B guides the air towards the outlets on the dashboard and the air-distribution duct 30C guides the air towards the air outlets under the dashboard in the foot well region.

The air-conditioning housing 2 further comprises at least one element for cooling the air in the vehicle. This element comprises a composite phase-change material 40, the structure of which is shown in FIGS. 2a and 2b. Said composite phase-change material 40 is made of at least one first material which is a phase-change material 42 and one second material 44 of which the structure forms a support matrix for said phase-change material. The composite phase-change material 40 is such that, owing to its composite structure, it maintains a rigid structure whether the phase-change material 42 is in the solid or liquid state.

The use of a composite phase-change material 40 allows increased thermal conductivity to be ensured compared with a phase-change material integrated into the second heat exchanger 16, and also allows good mechanical strength to be ensured.

The composite phase-change material 40 is covered with a heat-conducting protective layer 46 that prevents the phase-change material 42 from escaping, either by flow or by evaporation. The fact that the protective layer 46 is heat-conducting allows good heat exchange to be maintained between the air flow that passes in contact with the composite phase-change material 40 and the phase-change material 42. In order to maintain good thermal conduction between the outside surroundings and the composite phase-change material 40, the protective layer 46 has a thickness of from 0 to 100 µm.

The heat-conducting protective layer 46 may in particular be:
a carbon-fibre layer,
an oleophobic and hydrophobic surface treatment having organic/inorganic hybrid nanoparticles,
a metal film having high thermal conductivity, or
an evaporative layer of heat-conducting polymer.

A protective layer 46 which is in the form of a carbon-fibre layer or a metal film having high thermal conductivity in particular has a thickness that is greater than or equal to 20 µm, whereas a protective layer 46 which is in the form of a surface treatment or an evaporative layer of heat-conducting polymer has a thickness of less than 20 µm.

A thick protective layer 46 has lower thermal conduction but greater protective potential, and conversely, a thinner protective layer has better thermal conduction but lower protective potential. Therefore, the choice of the type of protective layer 46 is dependent on the placement of the composite phase-change material 40 within the air-conditioning device 1.

The phase-change material 42 used in the composite phase-change material 40 may be, in particular, an organic or inorganic phase-change material of plant or other origin. It preferably has a melting temperature of between 9 and 13° C. In addition, in order to ensure a high capacity for energy storage and therefore for removing heat from the air intended for the passenger compartment, said phase-change material advantageously has a latent heat of between 100 and 300 KJ/kg.

The second material 44 that forms the support matrix for the phase-change material 42 within the composite phase-change material 40 may be a matrix of carbon capillary fibres or polymer capillary fibres.

As shown in FIG. 2b, the composite phase-change material 40 may also comprise at least one rigid structural reinforcement 48 therewithin. This rigid structural reinforcement 48 gives the composite phase-change material 40 better mechanical strength. The rigid structural reinforcement 48 may be, for example, a metal framework or a plastics framework surrounded by the composite phase-change material 40. As shown in FIG. 2b, the rigid structural reinforcement 48 may be entirely surrounded by the composite phase-change material 40. As shown in FIG. 2b, the composite phase-change material 40 may be entirely covered with the heat-conducting protecting layer 46.

According to a first embodiment of the invention shown in FIG. 1, the element for cooling the air in the vehicle comprising the composite phase-change material 40 surrounds the second heat exchanger 16 at least in part. Therefore, when the air-conditioning loop is stopped, the air intended for the passenger compartment, which is passing through the heat exchanger, continues to be cooled due to the transfer of heat energy between the air and the second heat exchanger 16. Instead of being removed by the heat-transfer fluid, this heat energy is absorbed by the composite phase-change material 40, wherein the composite phase-change material passes from a solid to a liquid state.

According to a variant of this first embodiment, the composite phase-change material 40 is used as a material for producing the support for the second heat exchanger 16.

This configuration around the second heat exchanger 16 in particular allows the space required for integrating the composite phase-change material 40 into the air-conditioning housing 2 to be limited.

The element for cooling the air in the vehicle comprising the composite phase-change material 40 may also be placed downstream of the second heat exchanger 16 within the air-inlet duct 2, and thus may be in direct contact with the air intended for the passenger compartment and therefore may efficiently exchange the heat energy therewith and therefore improve comfort for the user if the air-conditioning loop is stopped. For this purpose, the composite phase-change material 40 is advantageously placed downstream of the second heat exchanger 16.

According to a second embodiment, shown in FIG. 3, the composite phase-change material 40 is placed between the second heat exchanger 16 and the mixing and redistribution chamber 26.

According to a third embodiment, shown in FIG. 4, the element for cooling the air in the vehicle comprising the composite phase-change material 40 is placed within the air-distribution conduits 30A, 30B, 30C. This allows the space required for the composite phase-change material 40 in the air-conditioning housing to be limited.

According to a fourth embodiment, shown in FIG. 5, the element for cooling the air in the vehicle comprising the composite phase-change material 40 is integrated into the closure flaps 28. This makes it possible to limit the space required for the composite phase-change material 40 in the air-conditioning housing 2 and limits the disturbances to the air flow.

The composite phase-change material 40 may advantageously form said closure flaps 28 for ease of manufacture and for the purposes of economy.

According to a fifth embodiment, shown in FIG. 6, the element for cooling the air in the vehicle comprising the composite phase-change material 40 is integrated into the same wall of the air-conditioning housing 2. In the same way, this makes it possible to limit the space required for the composite phase-change material 40 in the air-conditioning housing 2 and limits the disturbances to the air flow.

The composite phase-change material 40 may also, and advantageously, form the wall of the air-conditioning housing 2, again for ease of manufacture and for the purposes of economy.

According to a sixth embodiment, shown in FIG. 7, the element for cooling the air in the vehicle comprising the composite phase-change material 40 is placed in the region of the air diffuser 32 in the passenger compartment. The phase-change material 40 may thus form a diffusion grating 34 at the outlet of the air diffuser 32 in the passenger compartment or may form flaps 36 for orienting and/or closing off the air flow entering the passenger compartment.

Therefore, it is clear that by applying a heat-conducting protective layer, the composite phase-change material becomes more durable because the phase-change material that it contains remains therewithin.

The invention claimed is:

1. An air-conditioning device for a motor vehicle comprising:
    an air-conditioning loop which includes:
        a first heat exchanger that is in contact with outside air, and
        a second heat exchanger that is placed in an air conditioning housing, and
    at least one element for cooling the outside air which includes a composite phase-change material made of at least one first material which is a phase-change material and at least one second material of which the structure forms a support matrix within said phase-change material, wherein said composite phase-change material is covered with a heat-conducting protective layer, and wherein said at least one element for cooling surrounds at least in part said second heat exchanger.

2. The air-conditioning device of claim 1, wherein said composite phase-change material comprises at least one rigid structural reinforcement.

3. The air-conditioning device of claim 2, wherein said rigid structural reinforcement is entirely surrounded by said composite phase-change material.

4. The air-conditioning device of claim 2, wherein said rigid structural reinforcement is a metal framework.

5. The air-conditioning device of claim 2, wherein said rigid structural reinforcement is a plastic framework.

6. The air-conditioning device of claim 1, wherein said composite phase-change material is entirely covered with said heat-conducting protective layer.

7. The air-conditioning device of claim 1, wherein said heat-conducting protective layer is a carbon-fiber layer.

8. The air-conditioning device of claim 1, wherein said heat-conducting protective layer is an oleophobic and hydrophobic surface treatment having organic/inorganic hybrid nanoparticles.

9. The air-conditioning device of claim 1, wherein said heat-conducting protective layer is a metal film having high thermal conductivity.

10. The air-conditioning device of claim 1, wherein said heat-conducting protective layer is an evaporative layer of a heat-conducting polymer.

11. The air-conditioning device of claim 1, wherein said composite phase-change material has a melting temperature of between 9 and 13 degrees C.

12. The air-conditioning device of claim 1, wherein said composite phase-change material has a latent heat of between 100 and 300 KJ/kg.

13. The air-conditioning device of claim 1, wherein said air conditioning housing defines a mixing chamber and a plurality of air-distribution ducts.

14. The air-conditioning device of claim 1, wherein said at least one element for cooling is disposed in a region of a passenger compartment of the motor vehicle.

15. The air-conditioning device of claim 2, wherein said at least one element for cooling forms a diffusion grating at an outlet of an air diffuser in a passenger compartment of the motor vehicle.

16. The air-conditioning device of claim 2, wherein said composite phase-change material is entirely covered with said heat-conducting protective layer.

17. The air-conditioning device of claim 2, wherein said at least one element for cooling forms flaps for orienting and/or closing off air flow entering a passenger compartment of the motor vehicle.

18. An air-conditioning device for a motor vehicle comprising:
an air-conditioning loop which includes:
a first heat exchanger that is in contact with outside air, and
a second heat exchanger that is placed in an air conditioning housing; and
at least one element for cooling the outside air which includes a composite phase-change material made of at least one first material which is a phase-change material and at least one second material of which the structure forms a support matrix within said phase-change material, wherein said composite phase-change material is covered with a heat-conducting protective layer, and wherein said at least one element for cooling forms a diffusion grating at an outlet of an air diffuser in a passenger compartment of the motor vehicle.

19. An air-conditioning device for a motor vehicle comprising:
an air-conditioning loop which includes:
a first heat exchanger that is in contact with outside air, and
a second heat exchanger that is placed in an air conditioning housing: and
at least one element for cooling the outside air which includes a composite phase-change material made of at least one first material which is a phase-change material and at least one second material of which the structure forms a support matrix within said phase-change material, wherein said composite phase-change material is covered with a heat-conducting protective layer, and wherein said at least one element for cooling surrounds at least in part said second heat exchanger and forms flaps for orienting and/or closing off air flow entering a passenger compartment of the motor vehicle.

* * * * *